Dec. 8, 1936.  G. WHEAT  2,063,417
BATTERY FILLING APPARATUS
Filed Dec. 28, 1934  2 Sheets-Sheet 1
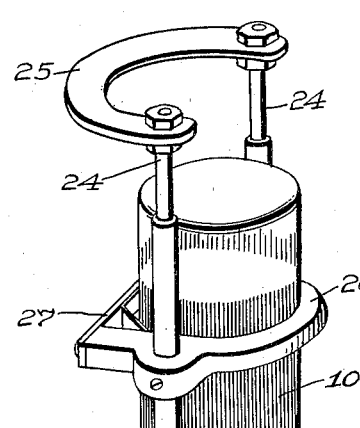
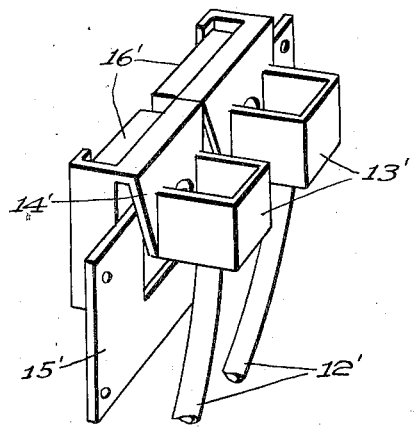
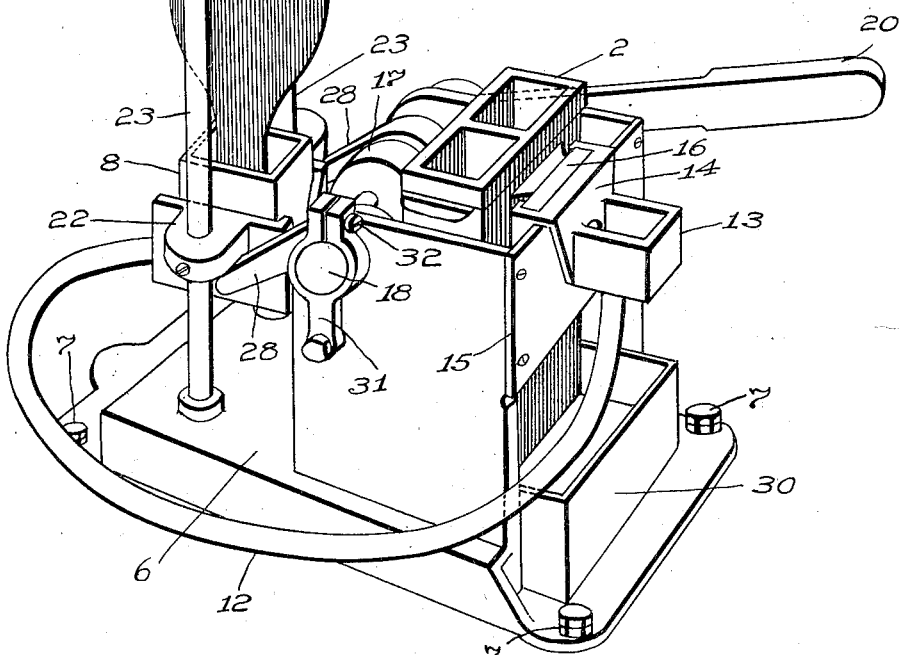

Dec. 8, 1936.    G. WHEAT    2,063,417
BATTERY FILLING APPARATUS
Filed Dec. 28, 1934    2 Sheets-Sheet 2
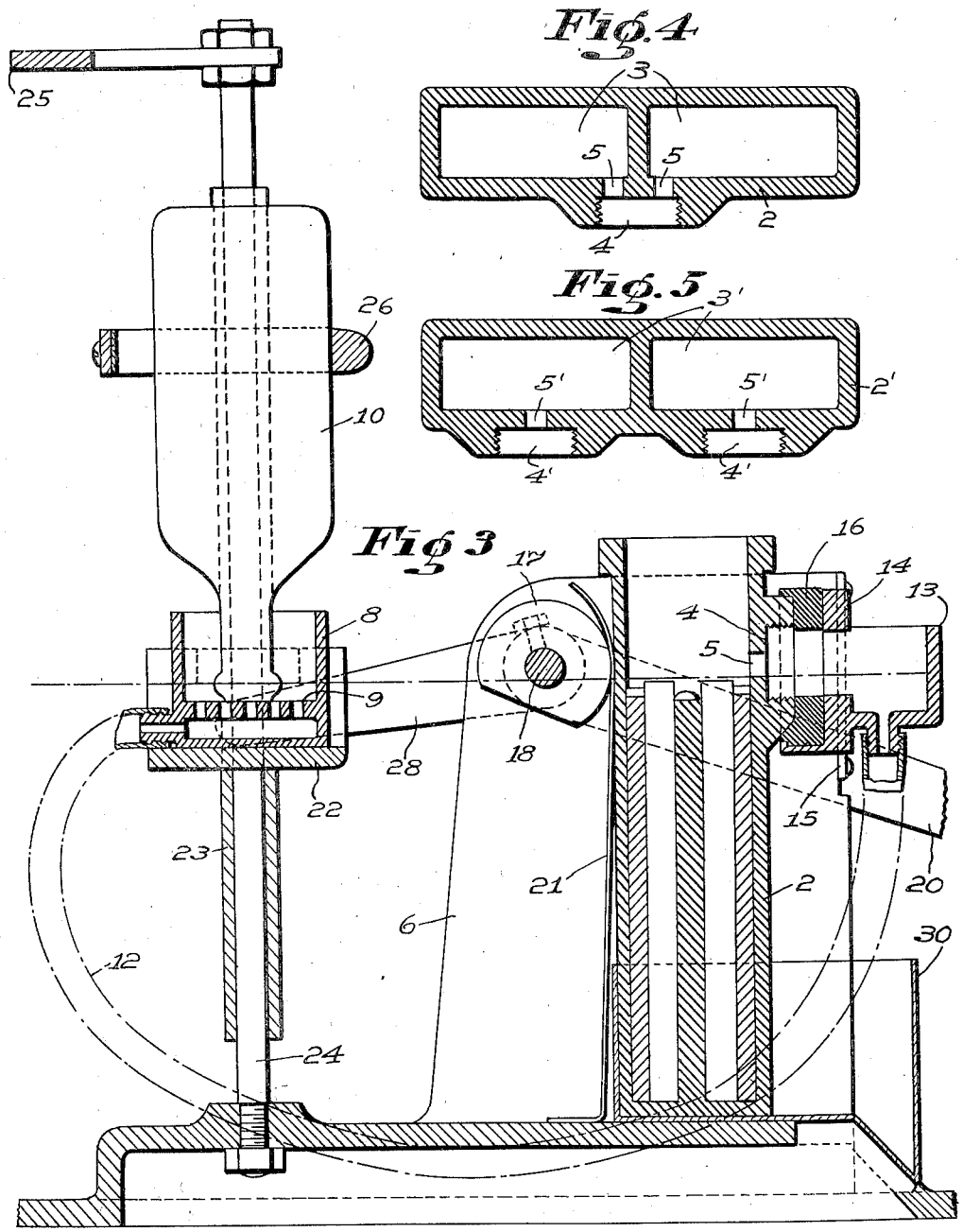

Patented Dec. 8, 1936

2,063,417

UNITED STATES PATENT OFFICE 2,063,417

BATTERY FILLING APPARATUS

Grant Wheat, Marlboro, Mass., assignor to Koehler Manufacturing Company, Marlboro, Mass., a corporation of Massachusetts Application December 28, 1934, Serial No. 759,500

5 Claims. (Cl. 226—39)

This invention relates to apparatus for filling batteries and other containers which can be filled in essentially the same manner and which may, therefore, be regarded as equivalents for batteries, so far as this invention is concerned.

After the elements of a storage battery have been assembled in the case and before the battery is shipped, it is filled with distilled water. In some of these batteries, particularly those designed to supply the current for miner's lamps and other lamps which are carried by the user, it is desirable to have this filling operation performed with a considerable degree of accuracy so that the quantity of water necessary to the proper operation of the battery will be supplied, but an excessive amount will be avoided. The present invention aims to devise an apparatus with which this filling operation can be produced with the desired degree of accuracy and with a minimum of labor.

The nature of the invention will be readily understood from the following description when read in connection with the accompanying drawings, and the novel features will be particularly pointed out in the appended claims.

In the drawings,

Figure 1 is a perspective view of an apparatus constructed in accordance with this invention;

Fig. 2 is a similar view of an attachment for the apparatus illustrated in Fig. 1, this attachment being designed for use with another type of battery;

Fig. 3 is a vertical, sectional view, partly in elevation, of the apparatus shown in Fig. 1;

Fig. 4 is a horizontal, sectional view of the battery casing; and

Fig. 5 is a similar view of another type of battery casing.

Preliminary to a detailed description of the apparatus shown, it may be pointed out that a casing for the type of battery for which the illustrated apparatus is more particularly designed is shown in Figs. 1, 3 and 4 at 2. This casing is provided with two chambers 3—3, Fig. 4, designed to receive the battery plates and separators required for two cells, and is made of vulcanite, cellulose acetate, or any other suitable insulating material. It is provided in one side thereof with an aperture or inlet 4 through which the filling operation is performed, this aperture communicating with both chambers through small passages 5—5. Normally the aperture is closed by a screw threaded plug and a gasket against which the plug bears. The top of the battery is normally sealed. In filling these batteries it is desirable to have the solution or electrolyte just cover the plates and separators with very little, if any, surplus.

The apparatus shown in the drawings comprises a stand or support 6 including a suitable base designed to rest on a table, or the like. It may also be equipped with screws 7 in its corners for adjusting the stand into a level position. The stand provides a support for the battery casing 2 and means is also provided for connecting the inlet of the battery with a supply of water maintained at a substantially constant level in any suitable manner.

As illustrated, the water supply includes a reservoir or container 8 in which the open end of an inverted bottle 10 rests, the container having a perforated false bottom 9 to support the end of the bottle. Consequently, a substantially constant level is maintained barometrically in the container. A flexible tube 12 connects the container 8 with a fitting 13 secured rigidly to a bracket 14 which is removably supported in the front plate 15 of the stand, the bracket being grooved at its bottom and sides to slide into a slot formed in the plate 15. At its inner or left-hand side the bracket 14 carries a pad or cushion 16 of rubber designed to fit tightly against the facing of the boss on the battery casing in which the filling opening 4 is formed. This arrangement thus provides a connection for conducting water from the reservoir 8 to the battery, and the connector unit at the delivery end of the conductor is arranged to guide the water or other liquid into the intake opening of the battery. At the same time the attachment of the connector to the battery is a simple contact or surface engagement which is made leak-proof by using the rubber contact element 16.

For the purpose of making a tight joint between the wall of the battery adjacent to the inlet 4 and the rubber element 16, a cam 17 is arranged to act on the battery, this cam being mounted on a horizontal rock shaft 18, supported in the stand, and having a handle or lever 20 secured rigidly to it. A spring plate 21 is interposed between the cam and the battery. It will be observed that the cam has a flat face, as shown in Fig. 3, and that when the lever is swung into approximately an upright position, this face will be adjacent to the battery so that the latter can, at that time, be removed or replaced. However, when the lever is swung down it will act through the cam 17 and plate 21 to force the battery laterally toward the right, Figs. 1 and 3, and thus to press the wall of the battery surrounding the opening 4 firmly into engagement with the rubber pad or gasket 16. The battery and connector then are ready for the filling operation to proceed.

The container 8 is removably supported on a slide 22 secured rigidly to two sleeves 23—23 which run on two vertical rods or posts 24—24 secured rigidly to the base or stand 6. A yoke 25, Fig. 1, connects the upper ends of these posts. Also secured to the sleeves 23—23 is a bracket 26 in which the upper part of the bottle 10 is supported, a leaf spring 27 being fastened to a portion of the bracket to assist in steadying the bottle.

After the battery 2 has been placed in the proper position in the stand and clamped in this position, as above described, in readiness for filling, the handle or lever 20 is swung down approximately into the position shown in Fig. 3. This movement is transmitted through two arms 28—28 secured on the rock shaft 18 and underlying the opposite ends of the slide 22 to raise this slide into an elevated position. Such a movement lifts the container 8 and the bottle 10, raising them sufficiently to move the level of the liquid in the container up to a point slightly above the level of the bottom of the intake openings 5—5 in the battery. Water thereupon flows by gravity from the reservoir into the battery, filling both cells. It will be evident that the maximum level to which the cells can be filled is predetermined by the level of water in the reservoir or container 8. Consequently, when the cells have been filled to this level, a further flow of liquid into the battery will stop automatically. In the meantime the operator has removed the previously filled battery and inserted the plug for the opening 4. When he again turns to the battery in the stand, he raises the lever 20 sufficiently to lower the reservoir 8 again to its initial position. If the battery has been slightly overfilled the surplus will quickly drain through the openings 5 and the connector 13—16 into the cup 13 and tube 12. A further upward movement of the lever 20 will release the battery, whereupon it can be lifted out and another placed in the stand in readiness for filling. Thus the filling operation can be performed very rapidly, with a minimum of labor, and with a degree of accuracy ample for this purpose. The final level of the water is determined by the height of the lower edge of the aperture 5. The process thus is reliable, is economical of water, and requires relatively little care and practically no skill on the part of the operator.

In filling batteries in which the cells are provided with independent filling openings, the plate 15 may be replaced by the plate 15', shown in Fig. 2, and a connector of the double type may be installed in place of that above described. This connector is like that shown in Figs. 1 and 3, but includes two units or two connectors, each having its own cup 13' but both integral with or secured rigidly to the bracket 14' and each having its own rubber gasket or cushioning element 16', like that shown at 16 in Figs. 1 and 3. Two flexible tubes 12' connect the cups 13' to the reservoir 8. The filling operation with this apparatus is performed in exactly the same manner as above described in connection with Figs. 1 and 3.

In order to catch any water which may be spilled out of the battery in taking it out of the stand and any drip from the connector, a specially shaped pan or tray 30, Figs. 1 and 3, may be provided to rest on the base of the stand and the battery may be supported in this pan or tray.

Preferably a split clamp 31 is secured to the stand 6 at the side thereof opposite the lever 20 where it embraces the end of the shaft 18, and the ends of this clamp may be tightened by means of a screw 32 to apply a moderate degree of friction to the shaft and assist in holding the slide 22 and the parts mounted thereby in an elevated position without using a latch or other device for this purpose which would require actuation by the operator.

While I have herein shown and described a preferred embodiment of my invention, it will be evident that the invention may be embodied in other forms without departing from the spirit or scope thereof.

Having thus described my invention, what I desire to claim as new is:

1. In an apparatus for filling batteries having side inlets, the combination of a container for liquid, means for maintaining a substantially constant level of liquid in said container, a support for a battery, means for conducting liquid from said container to said battery, said conducting means including a connector having a cushioned outlet to engage the face of the battery around and adjacent to said inlet, mechanism including a cam for forcing said connector against the surface of said battery surrounding said inlet, additional means for relatively moving said battery and said reservoir to produce a gravity flow of liquid from the reservoir into said battery, and a single actuator for operating both said mechanism and said additional means.

2. In an apparatus for filling batteries having side inlets, the combination of a support for holding a battery casing in an upright position, a connector mounted at one side of the position occupied by said casing, said connector having an upright yielding member positioned for engagement with the upright face of said casing around its inlet and also having an aperture therethrough to connect with said inlet, means for conducting water to said connector, and means for moving said casing laterally, relative to said connector, to force said connector firmly against the face of said battery.

3. In an apparatus for filling batteries having side inlets, the combination of a support for holding a battery casing in an upright position, a connector mounted at one side of the position occupied by said casing, said connector having an upright yielding member positioned for engagement with the upright face of said casing around its inlet and also having an aperture therethrough to connect with said inlet, means for conducting water to said connector, a cam operable to move said casing laterally, relative to said connector, and means for operating said cam to produce said movement and thereby to force said connector firmly against the face of said battery.

4. In an apparatus for filling batteries having side inlets, the combination of a support for holding a battery casing in an upright position, a connector mounted at one side of the position occupied by said casing, said connector having an upright yielding member positioned for engagement with the upright face of said casing around its inlet and also having an aperture therethrough to connect with said inlet, means for holding a supply of water normally at a level lower than that of said inlet, means for conducting water from said supply to said connector, mechanism operable to change the relative level of said inlet and said water supply to cause the water to flow by gravity into said inlet, said mechanism including a manually operable device, and additional means arranged to be operated by said device for relatively moving said casing and said connector laterally toward each other to force said connector firmly against the face of said battery.

5. In an apparatus for filling batteries having side inlets, the combination of a support for holding a battery casing in an upright position, a connector mounted rigidly at one side of the position occupied by said casing, said connector including a substantially rigid drainage and overflow cup, and having a yieldable member positioned for engagement with said casing around its inlet, and also having an aperture therethrough to connect with said inlet, means for conducting water to said connector for flow through said aperture, and means for moving said casing laterally, relative to said connector, to force said connector firmly against the face of said battery.

GRANT WHEAT.